United States Patent

Höller et al.

[15] 3,657,638
[45] Apr. 18, 1972

[54] METHOD OF MAGNETIC FLAW DETECTION IN BODIES OF NON-CIRCULAR CROSS SECTION USING UNIDIRECTIONAL MAGNETIZATION AND DEMAGNETIZATION PULSES TO ELIMINATE EDGE DISTORTION OF THE MAGNETIC FIELD

[72] Inventors: Paul Höller, Oberhausen; Paul Scholten, Essen-Frintrop, both of Germany

[73] Assignee: Huttenwerk Oberhausen AG, Oberhausen, Germany

[22] Filed: Jan. 7, 1970

[21] Appl. No.: 1,275

Related U.S. Application Data

[63] Continuation-in-part of Ser. No. 775,665, Nov. 14, 1968, abandoned.

[30] Foreign Application Priority Data

Jan. 9, 1969 Germany...................P 19 00 992.8

[52] U.S. Cl.............................................324/37
[51] Int. Cl.............................................G01r 33/12
[58] Field of Search..............................324/37, 38

[56] References Cited

UNITED STATES PATENTS 2,764,733  9/1956  De Forest.............................324/38
2,979,655  4/1961  De Forest.............................324/37 X
3,534,258  10/1970 Förster.................................324/37

OTHER PUBLICATIONS

Lorenzi et al., Application of A. C. Bias To Magnetic Tape Method of Inspecting Billets; Material Evaluation; Jan. 1968; Vol. XXVI, No. 1, pp. 13–16.

Primary Examiner—Rudolph V. Rolinec
Assistant Examiner—R. J. Corcoran
Attorney—Karl F. Ross

[57] ABSTRACT

Method of detecting the location and extent of superficial faults, especially cracks, and for measuring the depths of such cracks in bars, billets, blooms, ingots, rods and tubes, especially of noncircular cross section. An electric current is passed axially through the elongated metallic body in one direction, and the magnetic flux of field (crossflux) generated by the passage of the electric current through the body is detected along the surface thereof. To avoid or reduce the effects of the edges of the noncircular body upon the detected magnetic field strength or flux and, therefore, to reduce the possibility that longitudinal cracks in the region of these edges will be undetected or poorly evaluated, the electric current passed axially through the bar is pulsed with the pulse shape being selected such that, in relation to the geometry of the bar, cracks in the surface in the region of the edges are detected. The pulsed current may derive from, say, a 50 or 60 Hz line source subjected to half-wave rectification; preferably pulse frequencies of 20 to 100 Hz are used. Periodically, or prior to each pulse, an erasing pulse is passed through the bar in the opposite direction to eliminate the residual magnetism from the previous scanning pulse or pulses. Hence the magnetization pulse is applied only to a nonmagnetized or previously demagnetized body.

5 Claims, 5 Drawing Figures

INVENTORS,
PAUL HÖLLER
BY PAUL SCHOLTEN

Karl G. Ross
ATTORNEY

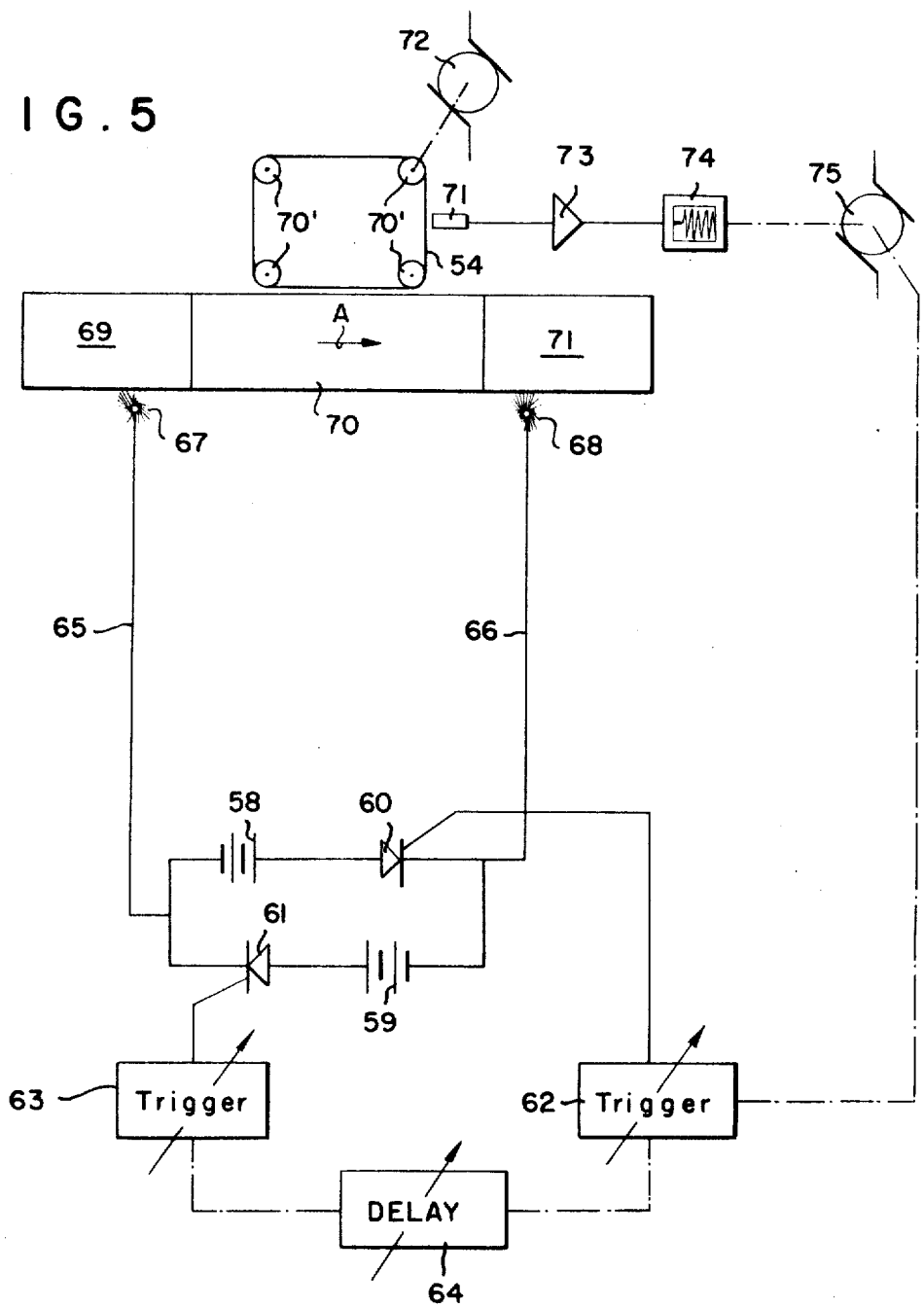

METHOD OF MAGNETIC FLAW DETECTION IN BODIES OF NON-CIRCULAR CROSS SECTION USING UNIDIRECTIONAL MAGNETIZATION AND DEMAGNETIZATION PULSES TO ELIMINATE EDGE DISTORTION OF THE MAGNETIC FIELD

CROSS-REFERENCE TO RELATED APPLICATION

This application is a continuation-in-part of our commonly assigned application Ser. No. 775,665 filed Nov. 14, 1968, now abandoned.

THE FIELD OF THE INVENTION

The present invention relates to a method of detecting surface cracks and other faults in bars, billets, blooms, rods, tubes and other elongated metallic bodies of noncircular cross section and having longitudinal edges extending in the direction of the major dimension of the metallic body, which edges may be rounded; the invention also relates to a method of and an apparatus for the detection of the depth of such surface cracks as well as to a system for locating them in the surface of the body. Still further, the invention deals with improvements in magnetographic detection and evaluation of faults in iron and other metallic bodies.

THE PRIOR ART

While numerous nondestructive testing methods have been proposed for the detecting the locating and evaluating of surface cracks, fissures, crevices and defect structures in metallic bodies, especially elongated bodies composed of ferromagnetic material (iron or iron-family metals), it has been found to be economical, both with respect to equipment, cost and labor expenses, to use magnetic methods for the evaluation of superficial faults of the character described.

In earlier magnetographic techniques, a unidirectional continuous electric current (direct current or d.c.) is passed longitudinally through the bar, thereby forming a magnetic field in a plane perpendicular to the bar with circular or peripheral magnetization. When the bar has longitudinal cracks, a disturbance of the magnetic field is manifested and a stray or cross-flux results; the stray flux has an amplitude which, for constant magnetization of the test body and given crack configuration and geometry, is proportional to the depth of the crack.

In magnetographic testing methods of this general type, the stray flux or scattered flux is not measured directly, but may be picked up by an endless band running along the surface of the test body for temporary storage, whereupon the band is scanned by an magnetic read-out head and the output thereof is delivered to a recording, measuring or indicating device.

When the cross section of the test body is circular, the lines of force and induced magnetic field are more or less axially symmetrical so that defects or cracks are readily detected using direct-current energization. It has been found, however, that the same does not hold true when the edges of the test body are angular, beveled or rounded. In these cases, the magnetic lines of force which run parallel to the surface of the body are nonhomogeneous and the deviations of the magnetic field from a uniform condition are large relative to the magnitude of the stray flux. In fact, the magnetization direction becomes then a function of position along the periphery and varies as a function of the tangent to this periphery.

For example, a test body having a square cross-section with rounded longitudinal edges manifests considerable distortion with up to 70 percent loss of signal to the rounded corners. Attempts to increase the field strength to make up for the loss of signal at the rounded corners prove unsatisfactory because the high magnetic intensity then brings the recording band to saturation and renders flaw-detection impossible. Consequently, efforts to use d.c. continuous energization in magnetographic techniques have proved to be unsatisfactory. Further efforts to remove this drawback by varying the technique for connecting the test body to the continuous electrical supply have also proved insufficient.

In another attempt at magnetographic testing of elongated bodies, the electricity is fed by brushes to the body immediately in front of and behind the test point. Although such a method does improve overall results, the current distribution is so very irregular that, even with increased edge sensitivity, the readings are hardly usable. Furthermore, such an arrangement becomes quite complicated for bodies of highly irregular cross sections.

All the above methods present a further substantial disadvantage in that, since the magnetic lines of force are generatrices of an imaginary axially extending cylinder, at certain points in irregularly shaped bodies, the field is perpendicular to the surface so that at these points even the deepest crack will create no stray flux and detection of the crack is not possible.

OBJECTS OF THE INVENTION

It is the principal object of this invention to provide an improved method of magnetically determining presence and location of superficial cracks and similar defect structures in ferromagnetic billets, blooms, rods and the like of non-circular cross section.

Another object of this invention is to provide improved apparatus for determining the presence of such cracks and evaluating both location and depth thereof.

BRIEF DESCRIPTION OF THE INVENTION AS RECITED IN RELATED APPLICATION

In the patent application, Ser. No. 777,665, we found that it is possible to overcome the aforedescribed disadvantages and to obtain a substantially homogeneous tangential magnetization along the periphery of the test body with noncircular section by doing away with the continuous electrical energization hitherto employed and providing a pulsed signal (direct current) of a frequency and a pulse shape designed to render the cracks at rounded corners more readily detectable. It has been found, for example, that half-wave or raw-rectified sinusoidal direct-current pulses at a frequency of 20 to 100 Hz, preferably 50 to 60 Hz inclusive, provide best results for the scanning of test bodies having rounded-corner cross sections. With angular corners, correspondingly angular flanks are preferred on the pulses of the energizing train. Thus, square-wave pulses are preferred when the corners form right angles. Experiments have shown that the use of half-wave d.c. pulses in place of continuous energization of the test body substantially completely eliminates the signal loss to the rounded corners and practically completely eliminates the influences of these corners with respect to the tangential magnetization. There is, however, a reduction in the magnetic induction in a direction normal to the surface toward the interior of the test body.

Since, as a rule, a quantitative determination of a depth of the cracks only to about 2 mm is of interest and the tolerances or variation in the position of the magnetic band and the roughness of the surface limit the detectability of cracks to a depth of up to, say, a hundreth of a mm, it has been found to be necessary to provide peripheral magnetization in a sheath only along the surface zones of the body to a depth of several millimeters. Indeed, it has, surprisingly, been found that the use of pulsating direct current as previously described results in such a magnetic sheath in which at least part of the flux is diverted inwardly by the cracks. As a result, with a frequency of 20 to 100 Hz, a substantial improvement in the homogeneity of the magnetic sheath parallel to the surface as well as in the orientation of the magnetic field along the surface can be attained by comparison with continuous direct current energization.

The method described immediately above does, indeed, increase the edge sensitivity of the apparatus substantially. However, it has been found that, since the contact brushes are usually spaced quite a distance apart, each body has been subjected to a great many, often several hundred, pulses before it comes into the testing station. By this time it has been partially (residually) magnetized through its entire cross section so that the current is not the only source of a magnetic field present.

All of these methods can, of course be applied to stationary workpieces. Nonetheless, as mentioned above, the customary practice is to axially displace these workpieces one behind the other through the testing station. In any case an effectively pulsed magnetization of the body is achieved. For example, with a workpiece moving at 0.5 m/second with the contacts spaced several decimeters apart, any point on this workpiece is only magnetized for several tenths of a second. Even this brief period, however, suffices to give the body a residual magnetism which is independent of the electric current.

It is, therefore, an object of the present invention to provide an improved method of and apparatus for detecting surface flaws in elongated metal bodies.

Another object is to provide such a method and apparatus which advance the principles of the parent application.

SUMMARY OF PRESENT IMPROVEMENT

The above objects are obtained, in accordance with features of the present invention, by avoiding this residual magnetization in the body to be tested, it having been discovered that homogeneous fields are established by the first few pulses of the test whereas later pulses are applied to a partially residually magnetized body. Thus, either reverse or demagnetization pulses are applied or the test is carried out with fewer than 50 pulses.

In installations where the bodies are continuously moved through the testing station, immediately before each magnetization pulse or small group of such pulses a demagnetization pulse of like shape and magnitude but opposite polarity is applied to the body. In this manner, the residual magnetism is canceled.

The method according to the present invention gives more uniform results than those heretofore obtained. This is believed to be due to the fact, surprisingly discovered, that the magnetization brought about by the first or first few pulses is indeed a true sheath conforming to virtually any shape so that the troublesome edge effect is practically eliminated. It has been found that the ratio between the strength of the field at the edge of a workpiece and that of the center is on the average around 15 percent better during the first 50 pulses than thereafter.

In accordance with another feature of the present invention, the sensing band is only read in those areas on it corresponding to the magnetized periods of the test body. The tape is, of course, erased when the residual field of the workpiece is canceled, and new information is imprinted thereon with the subsequent magnetizing pulse. Only that portion of tape which is lifted off the bar after the start of the demagnetization pulse and before the next magnetization pulse is erased; this portion is not read.

BRIEF DESCRIPTION OF THE DRAWING

The above and other objects, features, and advantages will become fully apparent from the following description, reference being made to the accompanying drawing, in which:

FIG. 5 is a side view diagrammatically illustrating an alternative apparatus for carrying out the present invention.

SPECIFIC DESCRIPTION

Figure 1:
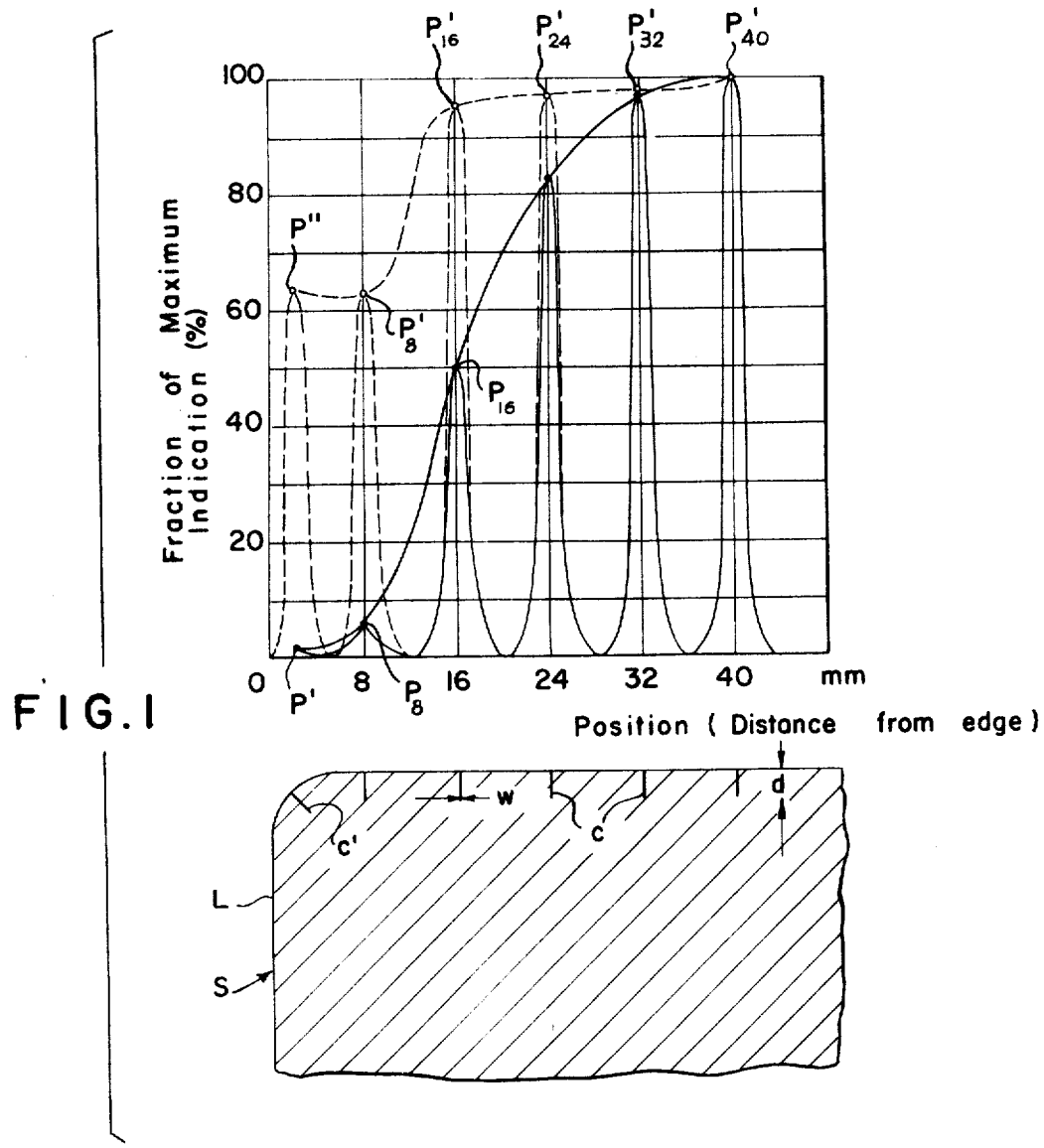
FIG. 1 shows the position of a number of cracks C formed in a test body S plotted along the abscissa in terms of the distance from the edge L of the body in millimeters against the fraction of the maximum indication assigned to the depth $d$ of the cracks C as generated by the measuring apparatus and plotted along the ordinate.

The graph of FIG. 1 applies to a specific example illustrative of the method of application Ser. No. 775,665 in which a bar of square cross section has a side width of 80 mm and rounded longitudinal edges R. At 8, 16, 24, 32 and 40 mm distances inwardly from the left-hand edge L, the bar is formed with cracks C having a width $w$ of 0.10 mm and a depth $d$ of 0.37 mm. The cracks extend in the longitudinal direction. A further crack C' exists at the rounded edge R. Pulse magnetization of the test body S is carried out with pulses obtained from the half-wave rectification of sinusoidal alternating current having a frequency of 50 Hz and a magnetization current of 1950 amp./ pulse (mean). The continuous d.c. magnetization is carried out with a current of 1,420 amp. which, measured along the center of the surface of the body is equivalent to a magnetic field intensity of 100 oersted. The magnetic band is of conventional character and is read with read-out signals $HP = 22$ kHz, $TP = 32$ kHz, $E = 6.1$.

In the graph, we have shown the peaks $P'$, $P_8$, $P_{16}$, etc. representing the depth $d$ of the cracks C' and C inwardly from the edge L in terms of the full measurement (100 percent) equivalent to the depth of 0.37 mm as produced by continuous d.c. magnetization.

It can thus be seen that, in spite of the fact that the crack C' and the crack corresponding to peak $P_8$ have depths equal substantially to the depth of the crack giving rise to the peak $P_{40}$, only a fraction of an indication is produced because of the edge effects which distort the magnetic field homogeneity.

When pulsating direct current is used in accordance with the present invention (broken line in FIG. 1), the peaks $P''$, $P_8'$, $P_{16}'$, $P_{24}'$ and $P_{32}'$ reach close to their true indications much earlier in the scanning of the width of the bar. As FIG. 1 shows, the result is a substantial improvement in the indication of the position and depth of the cracks substantially independently from location with respect to the edge. The pulses represented in FIG. 1, of course, are the output of the measuring unit and correspond to locations of distorted magnetization as recorded on the band.

Figure 2:
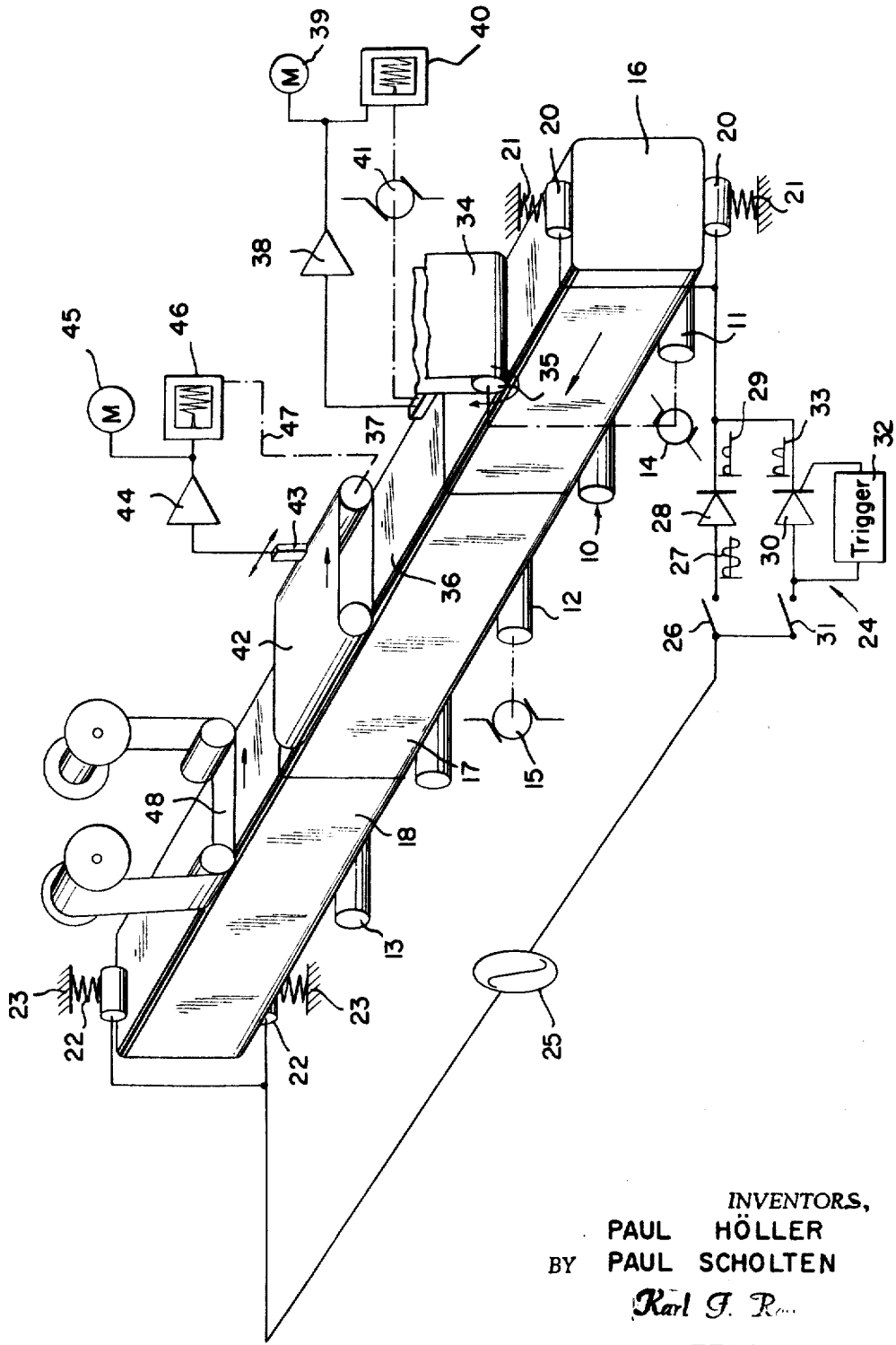
FIG. 2 is a perspective view diagrammatically illustrating an apparatus for carrying out the present invention.

In FIG. 2, we have shown an apparatus for carrying out the present invention in practice. This apparatus comprises a conveyor 10 having a plurality of rollers 11, 12 and 13 respectively driven by the motors 14, 15 etc. to advance the bars 16, 17 and 18 in the direction of arrow 19. Motor 14 is designed to accelerate the trailing band 16 so that, at its forward end, it is forced longitudinally against the preceding bar (17) which, in turn, is forced against the leading bar 18, a pair of rollers 20 are urged by springs 21 against the upstream bar 16 while another pair of rollers 22 are held by springs 23 against the downstream bar 18 to apply the pulsating electric current of a source 24 to the elongated bars which are composed of ferromagnetic material and are of square cross section with rounded corners. The forceful contact of the bars in end-to-end relationship ensures electrical continuity. Thus the leading bar is braked while the trailing bar is pushed forwardly.

The source of energizing current can consist of the usual line-current source 25 which is adapted to supply 20 to 100 Hz sinusoidal alternating current at 1,000 to 2,500 amp. via a switch 26 as represented by the wave form 27 ahead of the half-wave rectifier 28 whose half-wave rectifier output 29 is delivered to the bars. In the event the magnetic band has magnetization or hysteresis characteristics which would give rise to a simple a.c. magnetization of the recording medium, we may provide a solid-state controlled rectifier switching device 30, connectable in series with the source 25 by a switch 31 and triggerable by a timer 32 of conventional construction to produce a wave form in which the flanks of the d.c. pulses are modified as represented at 33.

Several recording systems are shown for the apparatus of FIG. 2 including an endless band 34 which passes under the roller 35 along the surface 36 of the bars 16 – 18 which are formed with longitudinal cracks, for example as shown in FIG. 1. While the magnetic band 34 may be removed after recording the condition of the surface of the bar and stored or brought to a read-out station immediately after recording the presence and depth of the cracks in terms of flux scattering, we have represented the read-out means by a head 37 which is connected to the usual amplifier 38 and to a meter 39 (e.g. a galvanometer or oscilloscope or a strip recorder 40 in which the pulses (see the graph of FIG. 1) are recorded as a function of the position of the head 37. A servomotor 41 connects the head 37 with the pen carriage of the recorder 40. The motor 14 which drives the bar 16 is coupled with the band drive roller 35 for synchronous movement of the band 34.

When intermittent movement of the bars is possible, the band may run transversely of the direction of displacement 19 as shown at 42. Here the band is scanned by a pick-up head 43 which energizes the amplifier 44, the depth meter 45 and the recorder 46 as previously described. The recorder is here advanced in step with the band 42 as represented by the line 47. The head 43 can sweep repeatedly parallel to the longitudinal edges of the bars. The magnetic field intensity at the surface of the body can also be measured by a magnetic tape 48 which sweeps across the bars and can be stored for later translation into magnetic indications of the presence or absence of cracks.

Of course, according to the present invention, when the band 42 or the band 48 is used, only a few pulses are passed through the row of billets 16, 17 and 18, the switches 26 and 31 are opened more than they are closed. If the band 42, for example, has a width that is equal to a tenth of the distance between the two contacts 20 and 22, then 10 pulses can be used to check the entire upper surface of the billets 16, 17 and 18 between these points, much fewer than the maximum of 50. Rather than a pulse train as shown at 29 and 33, only one or two pulses are allowed to pass at a time.

Figure 3:
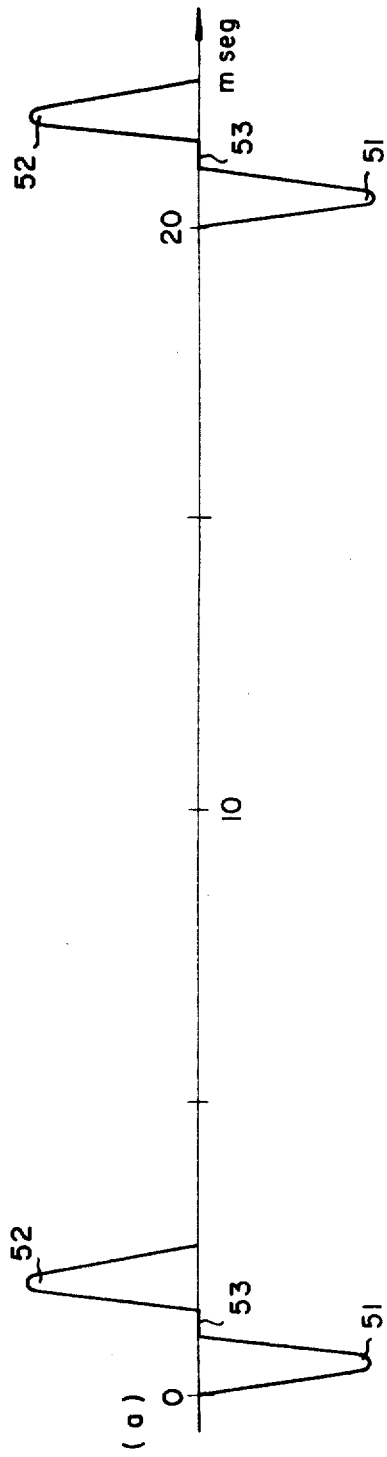
FIG. 3 is a graph showing the pulses according to the present invention.

FIG. 5 shows a circuit that generates pulses as shown in FIG. 3. A pair of batteries 58 and 59 each in series with a respective controlled rectifier (SCR) 60 and 61 are connected in parallel, with opposite poles together. Connected to each rectifier 60 and 61 is a respective adjustable trigger 62 and 63, respectively, both of which are connected to a common adjustable delay arrangement 64.

This circuit is connected via lines 65 and 67 to a pair of spaced brush contacts 67 and 68 contacting three billets 69 – 71 which are displaced in a direction A by an arrangement as described with reference to FIG. 2.

As shown in FIG. 3, when the trigger 62 fires the rectifier 60, a negative or reverse pulse 51 having a duration of 0.5 msec is formed. Thereafter the delay circuit 64 makes a pause 53 of 0.25 msec, whence the trigger 63 fires the rectifier 61 and an equal but opposite positive pulse 52 is applied to the billets 69–71. The delay arrangement 64 then prevents the trigger 62 from firing so that the pulses 51 are spaced 20 msec from each other.

Above the billets 69–71 is an endless tape 54 mounted on four rollers 70 one of which is driven by a motor 72. A pick-up head 71 is connected through an amplifier 73 to a recording device 74 powered by a servomotor 75.

Figure 4:
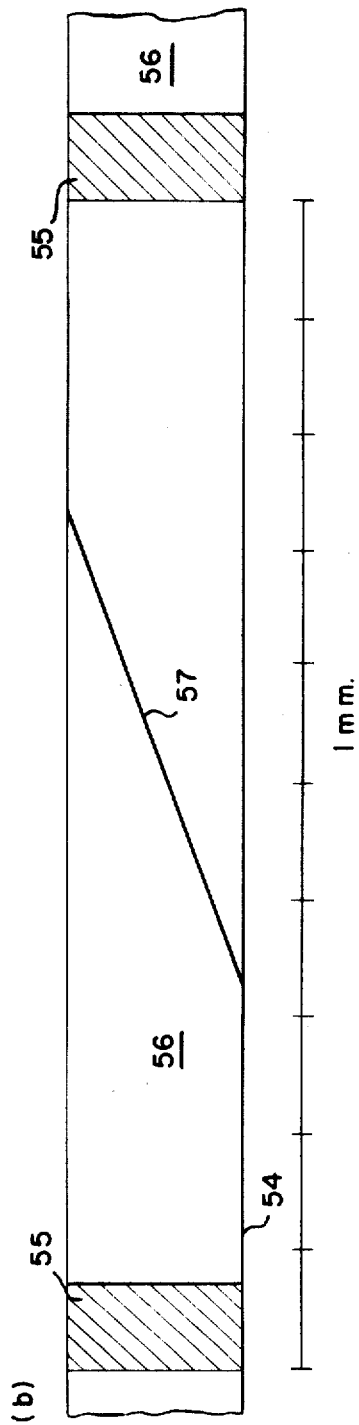
FIG. 4 shows a recorded tape illustrating principles of the present invention.

With reference to FIG. 4, if the tape 54 and the billets are moved at the same speed, for example, 0.5 msec, every millisecond, 0.5 mm of tape will be wound up. Thus, an erased area 55 having a length of 0.75 mm will be produced on the tape 54, with an information receiving region 56 between consecutive areas 55. The motor 75 is coupled to the trigger 62 so that the recording device 74 is rendered inoperative for 0.75 msec as the portion 55 of the band passes it. Any cracks or rills in the billet will be recorded in the region 56, one such is shown at 57. Thus, each pulse 52 magnetizes the bar momentarily, and the stray flux is picked up by the tape 54. In the interval before the subsequent erasing pulse 51, this tape is wound up and its information read off. The automatic erasing of both the bar and the tape, simultaneously, obviates the need of an erasing oscillator for the tape 54.

The pulse rate is dependent on the rate of travel of the billets 69–71, so that should this latter rate be greater the pulse rate and tape speed must be correspondingly increased.

The length of tape 54 lying on or adjacent to the billet 70 should be at most as long as that length corresponding to the interpulse interval, 10 mm here. A shorter contact surface is advantageous, as is a higher frequency, since both reduce the effects of the erased tape region 55.

We claim:

1. A method of magnetographically determining the presence of superficial cracks in an elongated body of noncircular cross section and measuring the depth of said cracks, said method comprising the steps of:
    passing at least one pulse of an electric current of one polarity longitudinally through said body to demagnetize the latter;
    passing a train of discrete unidirectional pulses of an electric current of a polarity opposite said one polarity longitudinally through said body with a pulse shape and intensity a magnetic field in said body without significant distortion at edges thereof;
    displacing a magnetic recording band close to the surface of said body at least during the passage of said pulses of opposite polarity to register scattering of the flux of the magnetic field indicative of such cracks; and
    converting registered indications on said band to a measurement of the depth of any detected cracks.

2. A method defined in claim 1 wherein at least some pulses but less than 50 of said opposite polarity are passed through said bar subsequently to the passage of said pulse of said one polarity.

3. A method defined in claim 2 wherein all of said pulses are of similar shape and magnitude.

4. The method defined in claim 3 wherein said body has a generally prismatic configuration of polygonal cross section with rounded corners and said electric current is a half-wave rectified alternating current.

5. The method defined in claim 1 wherein said pulses of said train have a frequency of 20 to 100 Hz.

* * * * *